US009533281B2

United States Patent
Shi et al.

(10) Patent No.: US 9,533,281 B2
(45) Date of Patent: Jan. 3, 2017

(54) POROSITIZATION PROCESS OF CARBON OR CARBONACEOUS MATERIALS

(71) Applicant: UNIVERSITY OF NORTH TEXAS, Denton, TX (US)

(72) Inventors: Sheldon Q. Shi, Denton, TX (US); Changlei Xia, Denton, TX (US)

(73) Assignee: UNIVERSITY OF NORTH TEXAS, Denton, TX (US)

( * ) Notice: Subject to any disclaimer, the term of this patent is extended or adjusted under 35 U.S.C. 154(b) by 0 days.

(21) Appl. No.: 14/211,357

(22) Filed: Mar. 14, 2014

(65) Prior Publication Data

US 2014/0264143 A1 Sep. 18, 2014

Related U.S. Application Data

(60) Provisional application No. 61/782,577, filed on Mar. 14, 2013.

(51) Int. Cl.

| | |
|---|---|
| *B01J 20/30* | (2006.01) |
| *B01J 20/20* | (2006.01) |
| *B01J 20/06* | (2006.01) |
| *C02F 1/28* | (2006.01) |
| *B01J 20/02* | (2006.01) |
| *B01J 20/28* | (2006.01) |
| *C01B 31/08* | (2006.01) |
| *C01B 31/12* | (2006.01) |

(52) U.S. Cl.
CPC ......... *B01J 20/3064* (2013.01); *B01J 20/0203* (2013.01); *B01J 20/06* (2013.01); *B01J 20/20* (2013.01); *B01J 20/28009* (2013.01); *C01B 31/081* (2013.01); *C01B 31/125* (2013.01); *C02F 1/283* (2013.01)

(58) Field of Classification Search
CPC ........ C01B 31/10; C01B 31/12; C01B 31/087; C01B 31/083; B01J 20/20
USPC .................. 423/460; 502/416, 417, 426, 428
See application file for complete search history.

(56) References Cited

U.S. PATENT DOCUMENTS

| | | | | |
|---|---|---|---|---|
| 3,355,317 A | * | 11/1967 | Keith, II et al. | 427/215 |
| 5,981,799 A | * | 11/1999 | Fruchey et al. | 564/216 |
| 5,985,008 A | * | 11/1999 | Tom | F17C 11/00 |
| | | | | 96/108 |

(Continued)

FOREIGN PATENT DOCUMENTS

| | | | | |
|---|---|---|---|---|
| CN | 101777652 A | * | 7/2010 | |
| CN | 101822987 A | * | 9/2010 | |
| CN | 102745687 A | * | 10/2012 | |

OTHER PUBLICATIONS

Machine english translation of CN101822987A.*

(Continued)

*Primary Examiner* — Richard M Rump
(74) *Attorney, Agent, or Firm* — Jackson Walker LLP

(57) ABSTRACT

Porositized/activated carbon processed from carbon or carbonaceous raw materials. The porositization process comprises: (1) loading porositizing agents; (2) thermal treatment; and (3) porous generation. In another embodiment, the porositization process comprises: (1) loading porositizing agents; and (2) thermal treatment wherein the carbon or carbonaceous materials undergo carbonization and self-activation during the thermal treatment. Activated carbon products that exhibit magnetic functionality.

7 Claims, 5 Drawing Sheets

(56) References Cited

U.S. PATENT DOCUMENTS

| | | | |
|---|---|---|---|
| 7,141,230 B2* | 11/2006 | Takeuchi | C01B 31/02 423/445 R |
| 2011/0042298 A1* | 2/2011 | Stouffer et al. | 210/443 |

OTHER PUBLICATIONS

Nguyen, Thi Dung, et al. "Magnetic Fe< sub> 2</sub> MO< sub> 4</sub>(M: Fe, Mn) activated carbons: Fabrication, characterization and heterogeneous Fenton oxidation of methyl orange." Journal of hazardous materials 185.2 (2011): 653-661.*

Machine english translation of CN102745687A.*

Schwickardi, Manfred, et al. "Scalable synthesis of activated carbon with superparamagnetic properties." Chemical communications 38 (2006): 3987-3989.*

Ai, Lunhong, et al. "Activated carbon/CoFe 2 O 4 composites: Facile synthesis, magnetic performance and their potential application for the removal of malachite green from water." Chemical Engineering Journal 156.2 (2010): 243-249.*

Wu, K. H., et al. "Preparation and characterization of bamboo charcoal/Ni 0.5 Zn 0.5 Fe 2 O 4 composite with core-shell structure." Materials Letters 60.21 (2006): 2707-2710.*

Jiang, Zongxuan, et al. "Activated carbons chemically modified by concentrated H2SO4 for the adsorption of the pollutants from wastewater and the dibenzothiophene from fuel oils." Langmuir 19.3 (2003): 731-736.*

Aber, S., Khatae, A., and Sheydaei, M. 2009. Optimization of activated carbon fiber preparation from kenaf using K2HPO4 as chemical activator for adsorption of phenolic compounds. Bioresource Technology 100(24): 6586-6591.

Álvarez, P., Blanco, C., and Granda, M. 2007. The adsorption of chromium (VI) from industrial wastewater by acid and base-activated lignocellulosic residues. Journal of Hazardous Materials 144(1-2): 400-405.

Benadjemiab, M., Millièrea, L., Reinerta, L., Benderdoucheb, N., and Duclauxa, L. 2011. Preparation, characterization and methylene blue adsorption of phosphoric acid activated carbons from globe artichoke leaves. Fuel Processing Technology 92(6): 1203-1212.

Freedonia Group. 2012. World Activated Carbon to 2016. http://www.freedoniagroup.com/DocumentDetails.aspx?DocumentId=595551.

Gadkareea, K. P., Jaroniec, M. 2000. Pore structure development in activated carbon honeycombs. Carbon 38(7): 983-993.

Gerçela, Ö., and Gerçelb, H. F. 2007. Adsorption of lead(II) ions from aqueous solutions by activated carbon prepared from biomass plant material of Euphorbia rigida. Chemical Engineering Journal 132(1-3): 289-297.

Gurten, I. I., Ozmak, M., Yagmur, E. and Aktas, Z. 2012. Preparation and characterisation of activated carbon from waste tea using K2CO3. Biomass and Bioenergy 37: 73-81.

Liu, L., Deng, Q.-F., Liu, Y.-P., Ren, T.-Z., and Yuan, Z.-Y. 2011. HNO3-activated mesoporous carbon catalyst for direct dehydrogenation of propane to propylene. Catalysis Communications 16(1): 81-85.

Lua, A.C., and Yang, T. 2004. Effect of activation temperature on the textural and chemical properties of potassium hydroxide activated carbon prepared from pistachio-nut shell. Journal of Colloid and Interface Science 274 (2): 594-601.

Mohana, D., and Pittman, C. U. 2006. Activated carbons and low cost adsorbents for remediation of tri- and hexavalent chromium from water. Journal of Hazardous Materials B 137(2): 762-811.

Moreno-Castilla, C., Ferro-Garcia, M. A., Joly, J. P., Bautista-Toledo, I., Carrasco-Marin, F., and Rivera-Utrilla, J. 1995. Activated carbon surface modifications by nitric acid, hydrogen peroxide, and ammonium peroxydisulfate treatments. Langmuir 11(11): 4386-4392.

Mozammel, H.M., Masahiro, O., and Bhattacharya, S.C. 2002. Activated charcoal from coconut shell using ZnCl2 activation. Biomass and Bioenergy 22(5): 397-400.

http://en.wikipedia.org/wiki/Activated_carbon, accessed Mar. 5, 2013.

Xu, B., Chen, Y., Wei, G., Cao, G., Zhang, H., and Yang, Y. 2010. Activated carbon with high capacitance prepared by NaOH activation for supercapacitors. Materials Chemistry and Physics 124(1): 504-509.

Zhang, H., Yan, Y., and Yang, L. 2010. Preparation of activated carbon from sawdust by zinc chloride activation. Adsorption-Journal of the International Adsorption Society 16(3): 161-166.

Cuerda-Correa, E. M., Macias-Garcia, A., Diaz Diez, M. A., Ortiz, A. L. 2008. Textural and morphological study of activated carbon fibers prepared from Kenaf. Microporous and Mesoporous Materials 111(1-3): 523-529.

* cited by examiner

POROSITIZATION PROCESS OF CARBON OR CARBONACEOUS MATERIALS

RELATED APPLICATIONS

This application claims priority to U.S. Provisional Patent Application Ser. No. 61/782,577, entitled POROSITIZATION PROCESS OF CARBON OR CARBONACEOUS MATERIALS, filed on Mar. 14, 2013, the entire content of which is hereby incorporated by reference.

BACKGROUND

Porositized carbon is considered a carbon material with a high amount of pores. Activated carbon is a main commercial product of the porositized carbon. Activated carbon is a crude form of graphite with a random or amorphous structure, which is highly porous with large internal surface area, exhibiting a broad range of pore sizes from visible cracks or crevices to slits of molecular dimensions. Generally, activated carbon has a surface area in excess of 500 $m^2/g$ as determined by the gas adsorption testing. In the adsorption analysis, non-polar gases, e.g. $N_2$, $CO_2$, Ar, $CH_4$, etc., are used, and the $N_2$ adsorption at 77 K is widely used.[1]

In the early $20^{th}$ century, powder activated carbon was produced using wood as a raw material. With further development, different types of the conventional powder activated carbon have been produced, including granular activated carbon, pelletized activated carbon, and etc. These types of activated carbon allow for easy recycling and waste minimization. The feedstocks for activated carbons include coconut shells, wood char, and lignin, among other materials.[1]

Activation methods can be divided into two categories: (1) physical/thermal activation; and (2) chemical activation. Physical/thermal activation uses a mild oxidizing gas, e.g. $CO_2$, water steam, etc., to eliminate the bulk of the volatile matters, followed by partial gasification. This method gives materials with higher porosity and more surface area than the chemical activation method.[1] The chemical activation method employs chemicals (such as acid, strong base, or salt) to increase the surface area.[2] The chemical activators for the activated carbon include potassium hydroxide $(KOH)^{[3]}$, sodium hydroxide $(NaOH)^{[4]}$, nitric acid $(HNO_3)^{[5]}$, sulfuric acid $(H_2SO_4)^{[6]}$, hydrochloric acid $(HCl)^{[7]}$, hydrogen peroxide $(H_2O_2)^{[8]}$, zinc chloride $(ZnCl_2)^{[9]}$, phosphoric acid $(H_3PO_4)^{[10]}$, potassium carbonate $(K_2CO_3)^{[11]}$, potassium phosphate dibasic $(K_2HPO_4)^{[12]}$, and cobalt acetate $(Co(OAc)_2)^{[13]}$.

Thermal activation can used for the activated carbon processed from biomass, such as wood, agriculture stems, and any other lignocellulosic based resources. Usually, the conventional thermal activation method is to use a mild oxidizing gas $CO_2$, including two steps, 1) carbonization with flowing inert gas, and 2) activation by $CO_2$. For instance, the biomass pyrolysis process happens at a pyrolysis temperature (e.g. 700° C.), followed by an activation process at a higher temperature (e.g. 800° C.) with flowing $CO_2$ as an activating gas. During the carbonization process, the inert gas flow is used, and so that the generated gas components (including the $CO_2$) due to the material decomposition are removed. During the activation process, usually at higher temperature, the additional $CO_2$ can be introduced to initiate the activation process.

Mozammel et al. (2002)[15] reported that activated carbon sales were estimated at 375,000 tons in 1990, not including the Eastern Europe and China. Sales could be over 450,000 tons if Eastern Europe and China were included. By late 1990s, the production of the activated carbon was estimated at about 700,000 tons/year, with a market growth of about 4-6%/year. In the Freedonia Group's report in 2012, "World Activated Carbon to 2016",[16] the activated carbon demand worldwide is expected to increase more than ten percent per year to 1.9 million metric tons in 2016. The large market demand will contribute to the high gross sales. The global activated carbon market was about $1.8 billion in 2011 and was estimated to reach $3.0 billion by 2016.

SUMMARY

The present invention relates to porositized carbon processed from carbon or carbonaceous materials using a metallic compound corrosion approach followed by thermal treatment, optionally combined with drying process, and porous generation to generate the porositized/activated carbon (referred to herein as a porositization process).

In an embodiment of the present invention, the porositization process comprises three steps: (1) loading one or more porositizing agents; (2) thermal treatment; and (3) porous generation.

In an embodiment of the present invention, the porozitation process comprises two steps: (1) loading one or more porositizing agents; and (2) thermal treatment wherein the carbon or carbonaceous materials undergo carbonization and self-activation during the thermal treatment.

The porositized/activated carbon products of the present invention may be processed from wood, coir, nutshells, lignite, petroleum pitch and the like through a porositization process described herein. The porositized/activated carbon products of the present invention are useful for water cleaning, gas purification, odor removal, color pigment removal, and various catalytic functions.

Additionally, in a further embodiment of the present invention, the activated carbon products exhibit magnetic functionality.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

The present invention relates to porositized/activated carbon processed from carbon or carbonaceous material using a metallic compound corrosion approach, followed by thermal treatment and acid treatment, to generate porositized/activated carbon (referred to herein as a porositization process).

The porositized/activated carbon products of the present invention are useful for water cleaning, gas purification, odor removal, color pigment removal, and various catalytic functions. The porositized/activated carbon products of the present invention may be processed from wood, coir, nutshells, lignite, petroleum pitch and the like through a porositization process described herein.

One embodiment of the present invention uses two types of raw materials, or combination, as feedstocks: (1) carbon material ("Carbon") (e.g. charcoal, carbon black, activated carbon, coal, peat, lignite, petroleum coke, and the like), and (2) carbonaceous material ("Carbonaceous") (e.g. coconut shells, wood char, bone char, lignin, sawdust, rice hulls, different lignocellulosic materials, sugar, peach pits, fish, fertilizer waste, waste rubber tire, synthetic polymers, and the like), or mixtures of the above materials. The porositizing agents of the present invention are metallic compounds capable of reacting with carbon when heated. The metals used in the metallic compounds include Fe, Cu, Zn, Ag, Cr, Co, Pt, Pd, Rh, Re, Mn, Sn, V, Pb, Ge, As, Se, Mg, Ca, Ba, Mo, Ru, Os, Ir, Y, or combinations thereof. Certain embodiments of the invention utilize $Fe_2O_3$, FeO, $Fe_3O_4$, $Fe(NO_3)_3$, $Fe_2(SO_4)_3$, $Fe(NO_3)_2$, $FeSO_4$, $FeSO_3$, $FeHSO_4$, $(NH_4)_2Fe(SO_4)_2$, $Fe(HCO_3)_2$, $Fe(OH)_3$, $Fe(OH)_2$, CuO, ZnO, AgO, $K_2Cr_2O_7$, $Fe_2(C_2O_4)_3$, $K_3[Fe(C_2O_4)_3]$, $FeCO_3$, $Co(OAc)_2$, $Cr(NO_3)_3$, $CuSO_4$, or combinations thereof, as metallic compounds.

Figure 1:
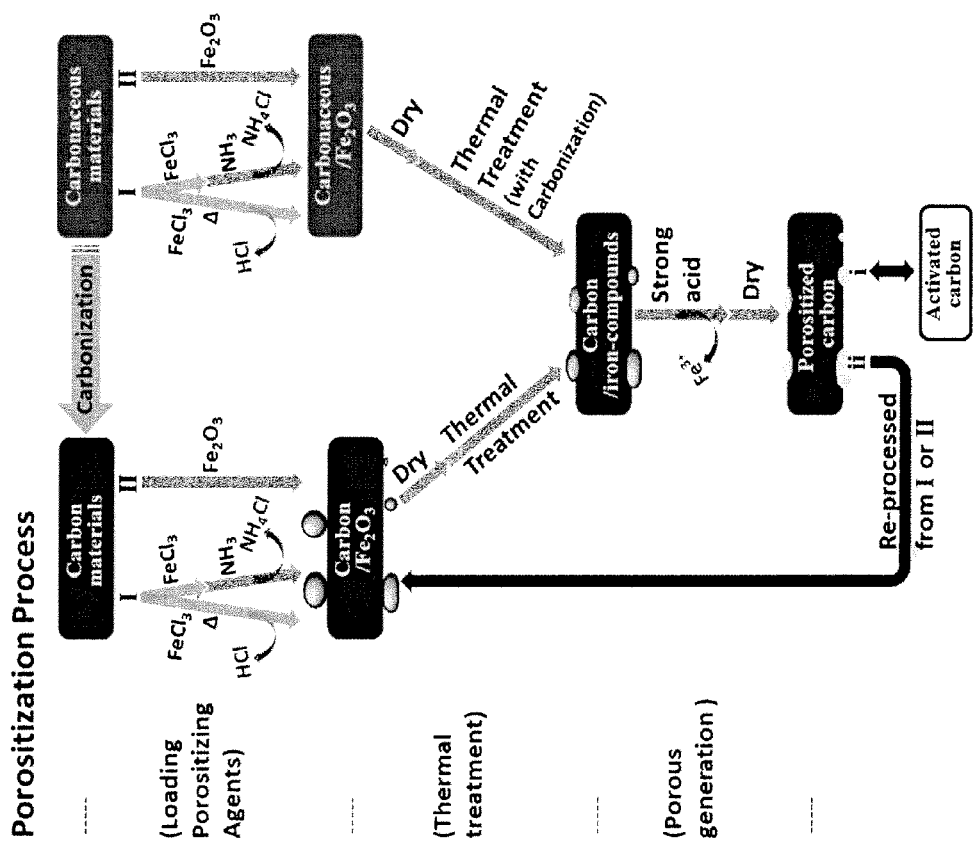
FIG. 1 shows the conversion process for porositized/activated carbon using $Fe_2O_3$ as a porositizing agent, in an embodiment of the present invention.

In an embodiment of the present invention, the porositization process comprises three steps: (1) loading one or more porositizing agents; (2) thermal treatment, optionally combined with drying process; and (3) porous generation. An example of a porositization process in accordance with the present invention (using iron oxide as illustration) is shown in FIG. 1.

Step One: Loading Porositizing Agent or Agents

In some embodiments of the present invention, the raw materials are in the form of particles or powders with a mesh size of above 10 meshes. For carbon materials, the porositization process can be performed by loading the porositizing agent onto the carbon materials, followed by filtering and drying to form carbon/porositizing agent composite particles. The drying methods of the present invention include heat drying, air drying, vacuum drying, and freeze vacuum drying, among others. Vacuum drying with a temperature of 100-150° C. vacuum drying is used in some embodiments of the invention. The drying process and the thermal treatment step can be combined. For carbonaceous materials, carbonization (thermal treatment) on the raw materials may be needed to convert the raw materials into carbon before the porositization process. Alternatively, the carbonaceous materials may be first mixed with the porositizing agent to form Carbonaceous/porositizing agent composites, and then carbonized during the thermal treatment step.

For loading of $Fe_2O_3$ as the porositizing agent (shown in FIG. 1), the raw materials are first dispersed in water (for example distilled water, approximately 2-200 times more in weight than the raw materials). The porositizing agents can be either pre-formed (shown as "II" in FIG. 1) before mixing into the carbon or carbonaceous materials, or formed during the mixing (shown as "I" in FIG. 1). The porositized carbon can either be used directly as activated carbon (shown as "i" in FIG. 1) or be reprocessed through the same porositization process to generate more porous structures (shown as "ii" in FIG. 1). The residues produced can be recycled.

The following methods can then be used to load the porositizing agent: The loading of porositizing agent or agents can be accomplished by (1) a metal oxide; (2) metal salt with base solution (e.g. ammonia); (3) heating of a metal salt aqueous solution up to the boiling temperature; or (4) combination thereof.

In a first embodiment, the porositizing agent is formed in situ as it is mixed into the raw materials. This is shown on FIG. 1 as I. The carbon dispersed in water (carbon/water) "solution" is mixed with the solution of $Fe^{3+}$, such as ferric chloride hexahydrate ($FeCl_3 \cdot 6(H_2O)$) at a target iron (Fe) to carbon (C) weight ratio of from about 1:1 to about 1:200. One mixing option is that the carbon/aqueous solution goes through an ultrasonic mixing for about 10 minutes to two hours depending on the ultrasonic power used (ultrasonic treatment could remove the potential adsorption gas on the surface of carbon materials for a better follow-up mixing result). The solution or dispersion is then stirred mechanically (e.g. a high shear mixing, a magnetic stirrer, or the like) into the $Fe_2O_3$ dispersed solution, or suspension.

The following two methods can then be employed to initiate the chemical reaction to form $Fe_2O_3$ particles in the carbon/aqueous solution or suspension (Carbon/$Fe_2O_3$) or carbonaceous material/$Fe_2O_3$ composite particles (Carbonaceous/$Fe_2O_3$):

(1) A base solution, such as $NH_3$/aqueous solution at a concentration of 1.5 mol/L in an amount of 3-9 times the Fe substance (e.g. 6 times), is added into the mixture through a titration process controlled at a constant speed (such as 2 drops/second) with stirring. Stirring is continued for a period of time (e.g. 12 hours) after the titration of the base solution is completed.

(2) The Carbon/$FeCl_3$ or Carbonaceous/$FeCl_3$ aqueous solution is heated above the boiling temperature of the aqueous solution (e.g. 150° C. for the heater), refluxed for sufficient time (e.g. 12 hours) for a complete hydrolysis of $FeCl_3$ employing a reflux condenser, and then cooled down to the room temperature for further use.

In a second embodiment of the present invention, the porositizing agent solution ($Fe_2O_3$) is pre-prepared first, and then mixed into the carbon or carbonaceous raw materials as above. The carbon or carbonaceous material dispersed in water undergoes ultrasonic mixing to remove the absorbed gas, and then the prepared $Fe_2O_3$ solution is mixed into the Carbon or Carbonaceous solution under ultrasonic mixing, followed by mechanical stirring for a sufficient time (e.g. 12 hours) to form Carbon/$Fe_2O_3$ or Carbonaceous/$Fe_2O_3$.

The Carbon/$Fe_2O_3$ or Carbonaceous/$Fe_2O_3$ solution undergoes a filtering process, either using filter papers or other filtering devices, then washed with adequate water (preferably distilled water) to obtain composite particles of Carbon/$Fe_2O_3$ or Carbonaceous/$Fe_2O_3$. The products are then dried in a vacuum oven at a temperature of over 50° C. (e.g. 120° C.) to remove the water.

Step Two: Thermal Treatment

The Carbon/$Fe_2O_3$ or Carbonaceous/$Fe_2O_3$ is placed into a vacuum furnace chamber. The chamber is first placed under vacuum for a period of time (e.g. 30 minutes), and an inert gas (e.g. Ar, $N_2$, He, and the like) is then introduced. Then the chamber is heated at a certain heating rate (e.g. 2° C./minute) under the flowing inert gas until the target temperature is reached, which should be higher than 300° C. (such as 1,200° C.). The vacuum furnace is maintained at the target temperature for a certain period of time, such as 10 minutes to 6 hours (e.g. 2 hours) depending on the temperature level and the composition of the treated mixture. For the Carbonaceous/$Fe_2O_3$, the carbonization of the raw materials happens during the thermal treatment (intermediate product Carbon/$Fe_2O_3$). After the thermal treatment, new structures of Carbon/iron-compounds composites (Carbon/iron-compounds) are formed, e.g. Fe(II), Fe(0), iron carbide, etc. The furnace is then cooled down to room temperature before the processed materials are removed from the chamber.

Step Three: Porous Generation of the Carbon

The Carbon/iron-compounds are put into an acid solution, e.g. HCl, $H_2SO_4$, $HNO_3$, HI, HBr, HF, $HClO_4$, HCOOH, $CH_3COOH$, $C_6H_5SO_3H$, $C_6H_5COOH$, or a combination thereof for mixing. In some embodiments, HCl, $H_2SO_4$, or $HNO_3$ are used as the acid mixture. For example, the solution mixture can be stirred first, and then further subjected to ultrasonic treatment for a certain time (e.g. 1 hour) and left stirring for a period of time for to complete the reaction between the iron compounds and acid. The resulting solution is filtered and then dried to obtain porositized/activated carbon. The resulting porositized/activated carbon powders (or porous carbon) can be re-processed with the above described procedures until a desired porous structure in the carbon powders is generated.

Magnetization Process for Magnetic Activated Carbon

In one embodiment of the present invention, the porositization process results in magnetic activated carbon products. For this process, the porositization agent can be iron oxide particles (e.g. $Fe_2O_3$, FeO, $Fe_3O_4$, or a mixture thereof) or any suitable alternative. The iron oxide particles can have dimensions in the range of approximately 1 nm to 1 μm. As disclosed in Step 1 above, the iron oxide particles may be loaded by either in situ mixing or direct mixing.

For the in situ mixing method, iron oxide particles are formed during the mixing process. First, the carbon or carbonaceous materials are dispersed in water and mixed with the solution of $Fe^{3+}$ (e.g. $FeCl_3$, $Fe_2(SO_4)_3$, $FeNH_4(SO_4)_2$, $FeBr_3$, and the like), or $Fe^{2+}$ (e.g. $FeCl_2$, $FeSO_4$, and the like), or a mixture thereof. The ratio of this mixture is described above in greater detail in Step One. The iron oxide particles are formed in the mixture by a) introducing the ammonia or a similar alkaline solution; and/or 2) heating up the mixture to the boiling temperature, and refluxing for sufficient time for a complete hydrolysis of $Fe^{3+}$, $Fe^{2+}$, or a mixture thereof. After the particles are formed, the suspension is cooled down to the room temperature to complete the iron oxide particle loading.

For the direct mixing method, the pre-formed iron oxide particles can be synthesized using $Fe^{3+}$ (e.g. $FeCl_3$, $Fe_2(SO_4)_3$, $FeNH_4(SO_4)_2$, $FeBr_3$, and the like), or $Fe^{2+}$ (e.g. $FeCl_2$, $FeSO_4$, and the like), or a mixture thereof. The pre-formed particles are then mixed into carbon or carbonaceous materials at a certain ratio described in greater detail above.

Depending on the carbon or carbonaceous material type, the carbon or carbonaceous material and iron oxide particle mixture can be placed under a vacuum to promote a better mixing result. For example, for the lignocellulosic materials, the vacuum process can help on the impregnation of the iron oxide particles into the micro-pore structure of the lignocelluloses. After the iron oxide particles and carbon or carbonaceous materials are thoroughly mixed, water is used to wash the composites (iron oxide and carbon or carbonaceous material mixture) to remove excess chemicals and particulates. A drying process is followed to remove the water before the next step.

In one embodiment of the present invention, the composites are then placed into a vacuum chamber and an inert gas (e.g., Ar, $N_2$, He, and the like) is introduced. The vacuum chamber containing the composites and inert gas is then heated to a temperature above 500° C. The temperature is held constant at an interval within the previously specified range of approximately 10 minutes to 6 hours. The thermal treated composites are then cooled gradually to room temperature. The resulting products are magnetic porositized/activated carbon products. The resulting magnetic porositized/activated carbon products can be re-processed with the above described procedures until a desired porous structure in the carbon powders is generated.

Self-Activation Process of Biomass for Activated Carbon

In one embodiment of the present invention, the step of carbonization and activation can be combined into a single step by controlling the inert gas flow and vacuum during the porositization process. By properly controlling the vacuum and inert gas flow, self-activation can occur as a result of the gases generated from the biomass fibers themselves, such as $CO_2$, and therefore no additional activation may be required. This self-activation process results in more efficient production of activated carbon at reduced processing costs with less environmental impact.

In an exemplary embodiment of the present invention, the biomass raw materials (wood chips/powder, cellulosic fibers from wood or agriculture plants, and the like) are loaded into a pyrolysis furnace chamber. The amount of the raw materials in the furnace should be controlled depending on the type and size of the chamber used. The chamber is first placed under vacuum for a period of time (e.g. 30 minutes), and an inert gas (e.g. Ar, $N_2$, He, and the like) is then introduced. Based on the condition of the furnace, this vacuum procedure can be repeated. Once the vacuum pump is turned off and inert gas flow has terminated, the temperature is increased at a certain ramping rate (e.g. 5° C./min.) to a target temperature in a range of about 500-1,500° C. This temperature is maintained for a period of time (e.g. 2 hours) wherein no addition vacuum pressure or inert gas is introduced to the chamber. Ceasing vacuum pressure and inert gas flow ensures that the $CO_2$ or other potential gas components generated from the biomass itself will not be pushed out of the chamber. The $CO_2$ or other potential gases generated from the biomass act as activation agents for the carbonized material from the biomass. This self-activation process combines the carbonization and activation steps into a single step.

In one embodiment of the present invention, iron oxide particles act as a porositization agent for carbon or carbonaceous materials. After the iron oxide particles are impregnated into the biomass materials, as described in detail above, the resulting composites undergo the self-activation process described herein. The iron-based particles interact with the biomass fibers during the carbonization process. Because of the addition of iron-based particles into the biomass fibers, the changes of the material structure during the thermal treatment can be significantly different from that without the nanoparticles introduced. The iron-based particles can serve as a catalyst to initiate structure changes of the biomass fibers. Since the impregnated iron-based nanoparticles can also serve as catalyst during the carbonization process, more crystalline structure of the carbon may be obtained from the biomass when the temperature is above 500° C. (e.g. 1200° C.), compared to that generated from the conventional activated carbon process.

EXAMPLE 1

Step 1. Preparation of Carbon/$Fe_2O_3$ (10/1, Wt/Wt)

1. 10 grams of carbon powder from recycled carbon brakes (200 MESH) were dispersed in 100 mL distilled water;
2. 3.385 grams of $FeCl_3.6(H_2O)$ was dissolved into 100 mL aqueous solution;
3. The solutions from 1 and 2 above were mixed, and stirred mechanically for one hour, followed by one hour of ultrasonic dispersion, and then subjected to further mechanical stirring;
4. While the mechanical stirring continued, 25 mL $NH_3$/aqueous solution (1.5 mol/L) was dropped into the mixture at the rate of two drops per second;
5. After continuous stirring for overnight, the mixture was filtered using a vacuum filtration system, and washed thoroughly with distilled water; and
6. The mixture was dried in a 120° C. vacuum oven for about 4 hours to obtain dried Carbon/$Fe_2O_3$ (10/1, wt/wt) composite particles.

Step 2. Thermal Treatment 1. 2 grams of carbon/$Fe_2O_3$ (10/1, wt/wt) composite particles were placed in an alumina crucible;
2. The sample was placed into a high temperature tube furnace (99.8% High Purity Alumina Tube with an internal diameter of 3.5 inches, an outside diameter of 4 inches, and a length of 30 inches);
3. The furnace was vacuumed for 30 minutes first and then the argon inert gas was introduced into the furnace for 30 minutes. This vacuum/inert gas introduction step was repeated 3 times before the temperature of the furnace was increased;
4. The temperature ramp speed for the furnace was set at 2° C. per minute to reach 1,200° C., and maintained at that temperature for 2 hours with argon continually flowing inside the furnace;
5. The furnace was cooled down to room temperature (the argon still continued to flow); and
6. The thermal treated Carbon/$Fe_2O_3$ called as Carbon/iron-compounds, were obtained.

Step 3. Generating Porositized Carbon

1. Carbon/iron-compounds were mixed into 100 mL HCl solution (1 mol/L), followed by one hour of ultrasonic treatment and thorough mechanical stirring;
2. The mixture was filtered using a vacuum filtration system, and washed thoroughly with distilled water; and
3. The resulting solids were dried in a 120° C. vacuum oven for about 4 hours to obtain the porositized/activated carbon.

Results

Figure 2:
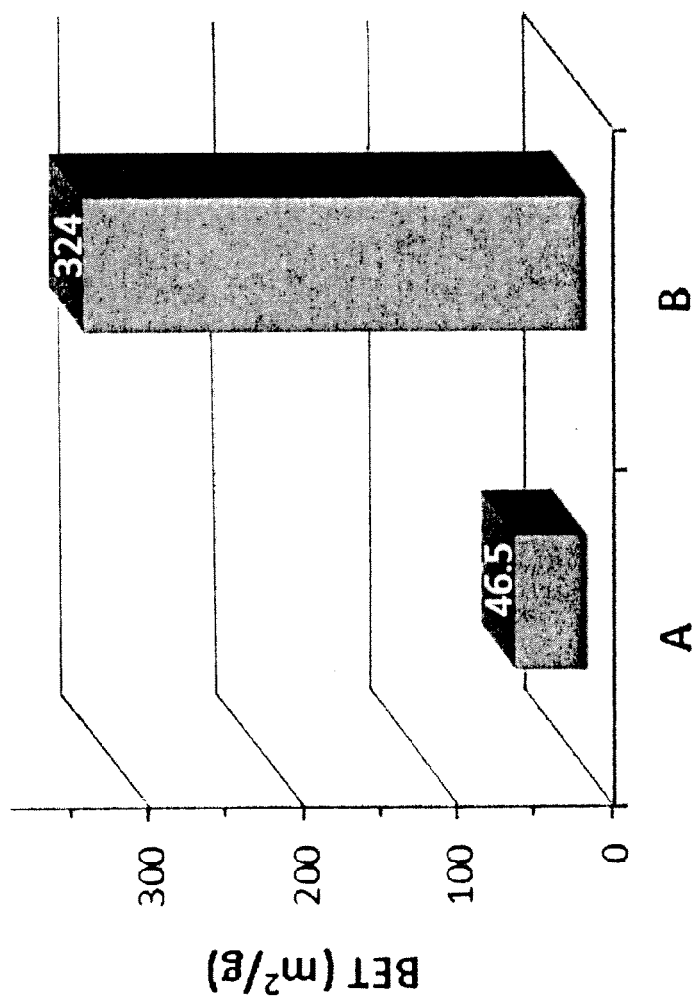
FIG. 2 shows BET values of: A) carbon powders (200 MESH); B) porous carbon in accordance with the present invention.

BET Measurements:

The specific surface area of carbon powders and the processed porous carbon were measured via BET. The results are shown in FIG. 2. The BET value of the final treated carbon product reached 324 $m^2$/g, which is about 7 times that of the original carbon powders (46.5 $m^2$/g).

Figure 3:
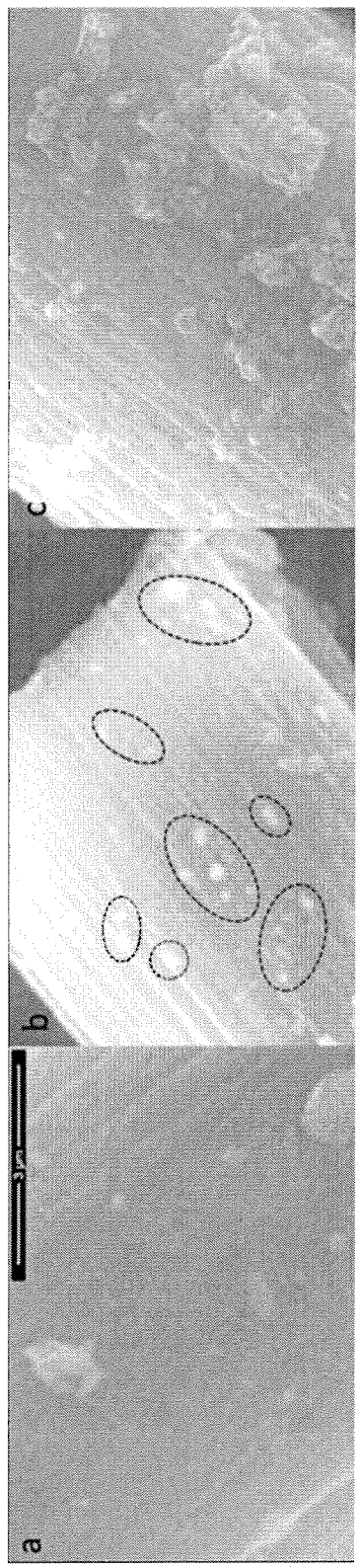
FIG. 3 shows SEM images for carbon rods: a) carbon powder; b) carbon/iron-compounds; and c) porous carbon in accordance with the present invention.

SEM Analysis:

FIG. 3 shows the SEM images of (1) carbon powder, (2) Carbon/iron-compounds, and (3) porositized carbon. The carbon powder and Carbon/iron-compounds show smooth surfaces. In the SEM image of Carbon/iron compound samples, iron compounds nanoparticles are clearly shown on the carbon powder surfaces. For the porositized carbon samples, a large number of pores on the porositized carbon products generated from the process can be seen on the carbon powder surfaces.

EXAMPLE 2

Step 1. Preparation of Carbon/$Fe_2O_3$ (50/1, Wt/Wt)

1. 20 grams of carbon from recycled carbon brakes (200 MESH) and 1.354 grams of $FeCl_3.6(H_2O)$ were dispersed into 500 mL distilled water;
2. Thorough mechanical stirring was applied;
3. Heat was applied using a heating reflux at 150° C. for overnight;
4. The system was cooled down, and sample was filtered using a vacuum filtration system, and washed thoroughly with distilled water; and
5. The sample was vacuum dried to obtain Carbon/$Fe_2O_3$ (50/1, wt/wt) composite particles.

Thermal Treatment and Porositized Carbon Generation

Steps 2 and 3 were the same as that described in Example 1.

Results of BET Analysis

Figure 4:
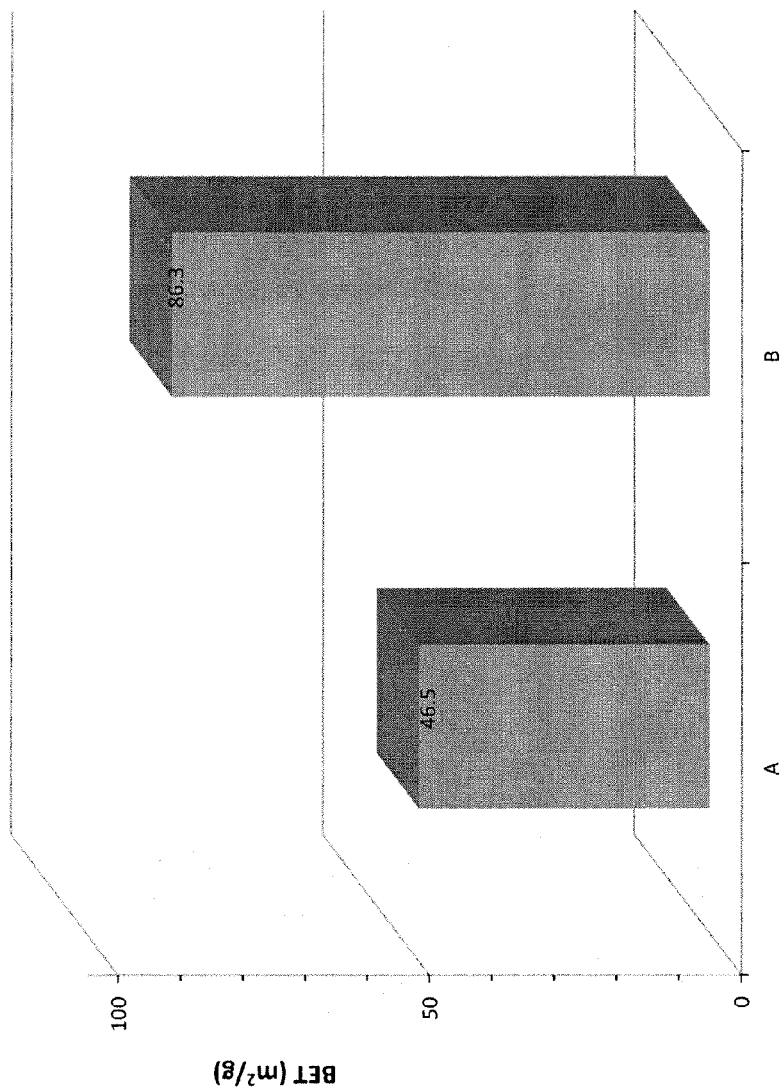
FIG. 4 shows BET values of A) carbon powders (200 MESH); B) porous carbon in accordance with the present invention.

As shown in FIG. 4, the BET value of the final treated carbon powder was increased to 86.3 $m^2$/g, as compared with carbon powders at 46.5 $m^2$/g.

EXAMPLE 3

Sample Obtained with Self-Activation Process 1. 50 grams of Kenaf bast fibers were placed in an alumina crucible;
2. The sample was placed into a high temperature box furnace (STY-1600C High Temperature Versatile Box Furnace with a 10×10×12-inch chamber);
3. The furnace was vacuumed for 1 hour before the argon inert gas being introduced into the furnace for 30 minutes. Before the furnace being heat up, this vacuum/inert gas introduction step was repeated 3 times. After this degassing process, the vacuum and inert gas flowing are stop;
4. The temperature ramp speed for the furnace was set at 5° C. per minute to reach 1,200° C., and maintained at the temperature for 6 hours without argon flowing (only the exhaust port, which is connected with a check valve, is open to avoid explosion and back flowing of air); and
5. The furnace was cooled down to room temperature.

Sample Obtained with No-Activation Process

Steps 1 to 3 are the same as that described in Sample Obtained with Self-Activation Process.

4. The temperature ramp speed for the furnace was set at 5° C. per minute to reach 1,200° C., and maintained at that temperature for 6 hours with argon continually flowing inside the furnace; and
5. The furnace was cooled down to room temperature (the argon still continued to flow).

Results of BET Analysis

Two duplicated comparison tests were conducted on the samples with both the self-activation process described above and regular carbonization process without activation (i.e. the "no-activation" samples).

Figure 5:
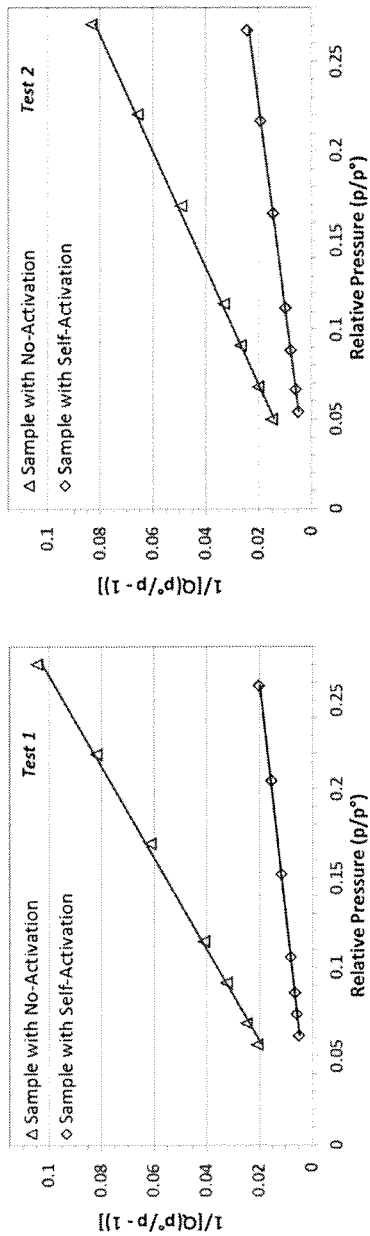
FIG. 5 shows Test 1 and Test 2 BET values of A) sample with self-activation; B) sample with no-activation in accordance with the present invention.

Test 1: As shown in FIG. 5 the specific surface area of self-activation carbon and no-activation carbon were measured. The BET value of the sample obtained using self-activation technique is 1280 m2/g with the productivity of 7.1%, compared with the sample obtained with no-activation is 252 m2/g with a productivity of 18.2%.

Test 2: As shown in FIG. 5 the BET value of sample from the self-activation process is measured as 1097 m2/g, with a productivity of 9.8%. The BET value of the sample with no-activation process is 319 m2/g, with a productivity of 17.4%.

EXAMPLE 4

Magnetic Activated Carbon

Magnetic activated carbon product was produced based on the porositization process described above. Specifically, Kenaf fibers were impregnated with iron oxide. The impregnated Kenaf fibers were then thermally treated at a temperature of 1,100° C. with a ramp speed of 10° C./minute. This temperature was maintained for 2 hours. After filtering and drying, the processed magnetic active carbon product was produced.

To demonstrate the magnetic properties of the sample, about 0.5 grams of the processed magnetic active carbon product was placed in a glass beaker. A magnet was applied to the top of the beaker. As a result of magnetic functionality, the magnetic activated carbon product was attracted to the magnet allowing for easy removal of the product from the beaker.

EXAMPLE 5

Magnetic Activated Carbon for Crude Oil Removal in Water 1. 0.3 mL of crude oil is added to a beaker containing about 150 mL of clear water;
2. Approximately 0.1 grams of processed magnetic activated carbon powder product is added into the water/crude oil mixture;
3. After approximately 2 minutes, the processed magnetic activated carbon powder product has absorbed the crude oil;
4. A magnet is applied to the water/crude oil/processed magnetic activated carbon powder product mixture; and
5. The magnet is removed from the beaker along with the magnetically attached oiled carbon material. The water shows clean.

EXAMPLE 6

Magnetic Activated Carbon for Engine Oil Removal in Water 1. 0.5 mL of engine oil is added to a beaker containing about 150 mL of clear water;
2. Approximately 0.2 grams of processed magnetic activated carbon powder product is added into the water/engine oil mixture;
3. After approximately 2 minutes, the processed magnetic activated carbon powder product has absorbed the engine oil;
4. A magnet is applied to the water/engine oil/processed magnetic activated carbon powder product mixture; and
5. The magnet is removed from the beaker along with the magnetically attached oiled carbon material. The water shows clean.

EXAMPLE 7

Magnetic Activated Carbon for Color Removal in Water

Rhodamine 6G is a kind of aromatic compound with high fluorescence. 10 mg of magnetic activated carbon was added into a vial of 10 mL 0.4 M Rhodamine 6G aqueous solution. The Rhodamine 6G water solution was visibly red. After shaking the mixture at room temperature for a predefined period of time, the solution was filtered through a 0.2 μm cellulose acetate membrane filter. After the colored water solution goes through the activated carbon material, the red color of the water was cleared.

REFERENCES CITED

The following references, to the extent that they provide exemplary procedural or other details supplementary to those set forth herein, are specifically incorporated herein by reference.

Non-Patent Literature (1) Mohana, D., and Pittman, C. U. 2006. Activated carbons and low cost adsorbents for remediation of tri- and hexavalent chromium from water. *Journal of Hazardous Materials B* 137(2): 762-811.
(2) http://en.wikipedia.org/wiki/Activated_carbon, accessed Mar. 5, 2013.
(3) Lua, A. C., and Yang, T. 2004. Effect of activation temperature on the textural and chemical properties of potassium hydroxide activated carbon prepared from pistachio-nut shell. *Journal of Colloid and Interface Science* 274 (2): 594-601.
(4) Xu, B., Chen, Y., Wei, G., Cao, G., Zhang, H., and Yang, Y. 2010. Activated carbon with high capacitance prepared by NaOH activation for supercapacitors. *Materials Chemistry and Physics* 124(1): 504-509.
(5) Liu, L., Deng, Q.-F., Liu, Y.-P., Ren, T.-Z., and Yuan, Z.-Y. 2011. $HNO_3$-activated mesoporous carbon catalyst for direct dehydrogenation of propane to propylene. *Catalysis Communications* 16(1): 81-85.
(6) Gerçela, Ö., and Gerçelb, H. F. 2007. Adsorption of lead(II) ions from aqueous solutions by activated carbon prepared from biomass plant material of *Euphorbia rigida*. *Chemical Engineering Journal* 132(1-3): 289-297.
(7) Alvarez, P., Blanco, C., and Granda, M. 2007. The adsorption of chromium (VI) from industrial wastewater by acid and base-activated lignocellulosic residues. *Journal of Hazardous Materials* 144(1-2): 400-405.
(8) Moreno-Castilla, C., Ferro-Garcia, M. A., Joly, J. P., Bautista-Toledo, I., Carrasco-Marin, F., and Rivera-Utrilla, J. 1995. Activated carbon surface modifications by nitric acid, hydrogen peroxide, and ammonium peroxydisulfate treatments. *Langmuir* 11(11): 4386-4392.

(9) Zhang, H., Yan, Y., and Yang, L. 2010. Preparation of activated carbon from sawdust by zinc chloride activation. *Adsorption-Journal of the International Adsorption Society* 16(3): 161-166.

(10) Benadjemiab, M., Millièrea, L., Reinerta, L., Benderdoucheb, N., and Duclauxa, L. 2011. Preparation, characterization and methylene blue adsorption of phosphoric acid activated carbons from globe artichoke leaves. *Fuel Processing Technology* 92(6): 1203-1212.

(11) Gurten, I. I., Ozmak, M., Yagmur, E. and Aktas, Z. 2012. Preparation and characterisation of activated carbon from waste tea using $K_2CO_3$. *Biomass and Bioenergy* 37: 73-81.

(12) Aber, S., Khatae, A., and Sheydaei, M. 2009. Optimization of activated carbon fiber preparation from kenaf using $K_2HPO_4$ as chemical activator for adsorption of phenolic compounds. *Bioresource Technology* 100(24): 6586-6591.

(13) Gadkareea, K. P., Jaroniec, M. 2000. Pore structure development in activated carbon honeycombs. *Carbon* 38(7): 983-993.

(14) Cuerda-Correa, E. M., Macias-Garcia, A., Diaz Diez, M. A., Ortiz, A. L. 2008. Textural and morphological study of activated carbon fibers prepared from Kenaf. *Microporous and Mesoporous Materials* 111(1-3): 523-529.

(15) Mozammel, H. M., Masahiro, O., and Bhattacharya, S. C. 2002. Activated charcoal from coconut shell using $ZnCl_2$ activation. *Biomass and Bioenergy* 22(5): 397-400.

(16) Freedonia Group. 2012. World Activated Carbon to 2016. http://www.freedoniagroup.com/DocumentDetails.aspx?DocumentId=595551

What is claimed is:

1. A method of making porositized/activated carbon comprising the steps of:
    loading a porositizing agent, or a mixture of porositizing agents, to carbon materials selected from the group consisting of charcoal, coal, peat, lignite and petroleum coke, or a carbonaceous material, to generate a carbon material/metallic compound aqueous dispersion, or a carbonaceous material/metallic compound aqueous dispersion, wherein the porositizing agent or mixture of porositizing agents comprises metallic compounds formed from the aqueous dispersion, wherein the metallic compounds include metals selected from the group consisting of Fe, Cu, Zn, Ag, Cr, Co, Pt, Pd, Rh, Re, Mn, Sn, V, Pb, Ge, As, Se, Mg, Ca, Ba, Mo, Ru, Os, Ir, Y, and combinations thereof, and wherein the metallic compounds are formed in situ in the aqueous dispersion by adding a base solution to the aqueous dispersion and mixing the resulting mixture;
    subjecting the carbon material/metallic compound aqueous dispersion, or the carbonaceous material/metallic compound aqueous dispersion, to a thermal treatment at a desired temperature above about 300° C. to give a thermally-treated carbon material/metallic compound mixture, or a thermally-treated carbonaceous material/metallic compound mixture; and
    subjecting the thermally-treated carbon material/metallic compound mixture, or the thermally-treated carbonaceous material/metallic compound mixture, to an acid to yield porositized/activated carbon.

2. The method of claim 1, wherein the metallic compounds are selected from $Fe_2O_3$, FeO, $Fe_3O_4$, $Fe(NO_3)_3$, $Fe_2(SO_4)_3$, $Fe(NO_3)_2$, $FeSO_4$, $FeSO_3$, $FeHSO_4$, $(NH_4)_2Fe(SO_4)_2$, $Fe(HCO_3)_2$, $Fe(OH)_3$, $Fe(OH)_2$, CuO, ZnO, AgO, $K_2Cr_2O_7$, $Fe_2(C_2O_4)_3$, $K_3[Fe(C_2O_4)_3]$, $FeCO_3$, $Co(OAc)_2$, $Cr(NO_3)_3$, $CuSO_4$, and combinations thereof.

3. The method of claim 1, wherein the step of subjecting the carbon material/metallic compound aqueous dispersion or the carbonaceous material/metallic compound aqueous dispersion to a thermal treatment further comprises the steps of:
    placing the carbon material/metallic compound aqueous dispersion or the carbonaceous material/metallic compound aqueous dispersion in a vacuum furnace chamber, wherein the carbon material/metallic compound aqueous dispersion or the carbonaceous material/metallic compound aqueous dispersion comprises the metallic compounds precipitate previously formed in situ in the aqueous dispersion by adding the base solution, and wherein a vacuum force is applied for a period of time and an inert gas is introduced into the vacuum furnace chamber;
    heating the vacuum furnace chamber at a certain heating rate, while maintaining the flow of inert gas, until the desired temperature above about 300° C. is reached;
    maintaining the vacuum furnace chamber at the desired temperature for a period of time between about 10 minutes and 6 hours;
    cooling the vacuum furnace chamber to room temperature; and
    removing from the vacuum furnace chamber a thermally-treated carbon material/metallic compound mixture or a thermally-treated carbonaceous material/metallic compound mixture.

4. The method of claim 1, wherein the step of subjecting the thermally-treated carbon material/metallic compound mixture or the thermally-treated carbonaceous material/metallic compound mixture to an acid further comprises the steps of:
    placing the thermally-treated carbon material/metallic compound mixture or the thermally-treated carbonaceous material/metallic compound mixture in an acid, wherein the acid comprises HCl, $H_2SO_4$, $HNO_3$, HI, HBr, HF, $HClO_4$, HCOOH, $CH_3COOH$, $C_6H_5SO_3H$, $C_6H_5COOH$, or a combination thereof;
    mixing the resulting solution for a period of time; and
    filtering and drying the resulting solution to yield porositized/activated carbon.

5. A method of making porositized/activated carbon comprising the steps of:
    loading a porositizing agent, or a mixture of porositizing agents, to carbon materials selected from the group consisting of charcoal, coal, peat, lignite and petroleum coke, or a carbonaceous material, to generate a carbon material/metallic compound aqueous dispersion, or a carbonaceous material/metallic compound aqueous dispersion, wherein the porositizing agent or mixture of porositizing agents comprises metallic compounds formed from the aqueous dispersion, wherein the metallic compounds include metals selected from the group consisting of Fe, Cu, Zn, Ag, Cr, Co, Pt, Pd, Rh, Re, Mn, Sn, V, Pb, Ge, As, Se, Mg, Ca, Ba, Mo, Ru, Os, Ir, Y, and combinations thereof, and wherein the metallic compounds are formed in situ in the aqueous dispersion by adding a base solution to the aqueous dispersion and mixing the resulting mixture; and
    subjecting the carbon material/metallic compound aqueous dispersion, or the carbonaceous material/metallic compound aqueous dispersion, to a thermal treatment at a desired temperature above about 300° C. in a vacuum furnace chamber under controlled vacuum and inert gas flow conditions to yield porositized/self-activated carbon.

6. The method of claim 5, wherein the metallic compounds are selected from $Fe_2O_3$, $FeO$, $Fe_3O_4$, $Fe(NO_3)_3$, $Fe_2(SO_4)_3$, $Fe(NO_3)_2$, $FeSO_4$, $FeSO_3$, $FeHSO_4$, $(NH_4)_2Fe(SO_4)_2$, $Fe(HCO_3)_2$, $Fe(OH)_3$, $Fe(OH)_2$, $CuO$, $ZnO$, $AgO$, $K_2Cr_2O_7$, $Fe_2(C_2O_4)_3$, $K_3[Fe(C_2O_4)_3]$, $FeCO_3$, $Co(OAc)_2$, $Cr(NO_3)_3$, $CuSO_4$, and combinations thereof.

7. The method of claim 5, wherein the step of subjecting the carbon material/metallic compound aqueous dispersion or the carbonaceous material/metallic compound aqueous dispersion to a thermal treatment further comprises the steps of:

placing the carbon material/metallic compound aqueous dispersion or the carbonaceous material/metallic compound aqueous dispersion in a vacuum furnace chamber, wherein the carbon material/metallic compound aqueous dispersion or the carbonaceous material/metallic compound aqueous dispersion comprises the metallic compounds previously formed in situ in the aqueous dispersion by adding the base solution, wherein a vacuum force is applied for a period of time and an inert gas flow is introduced into the vacuum furnace chamber;

terminating the vacuum force and inert gas flow into the vacuum furnace chamber;

heating the vacuum furnace chamber at a certain heating rate until a desired temperature from about 300° C. to about 1,500° C. is reached;

maintaining the vacuum furnace chamber at the desired temperature for a period of time between about 10 minutes and about 6 hours;

cooling the vacuum furnace chamber to room temperature; and removing from the vacuum furnace chamber a porositized/self-activated carbon.

* * * * *